Aug. 18, 1925.  
E. T. BENNINGTON  
1,550,140  
OVERHEAD SYSTEM FOR TRAVELING CARRIERS  
Filed Feb. 15, 1922  3 Sheets-Sheet 3
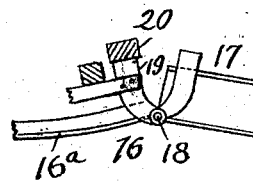
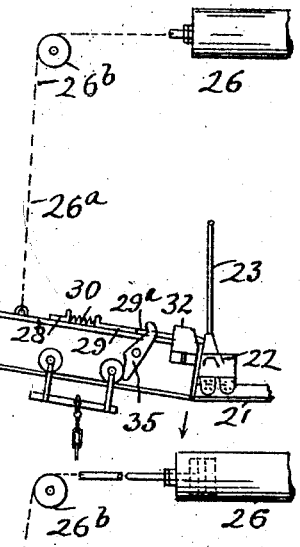
Fig. 5.
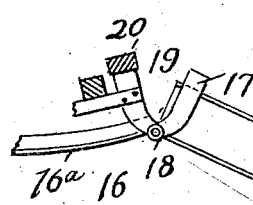
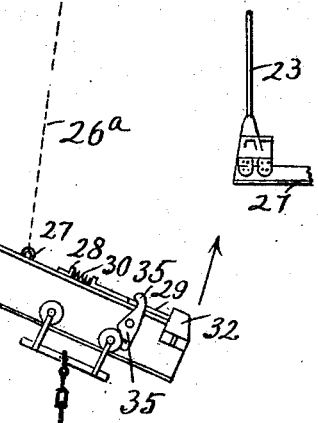
Fig. 6.
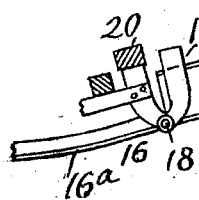
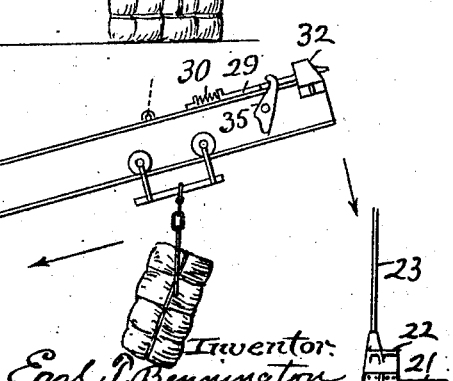
Fig. 7.
Inventor  
Earl T. Bennington  
by  
Thurston King & Hudson  
attys Patented Aug. 18, 1925.

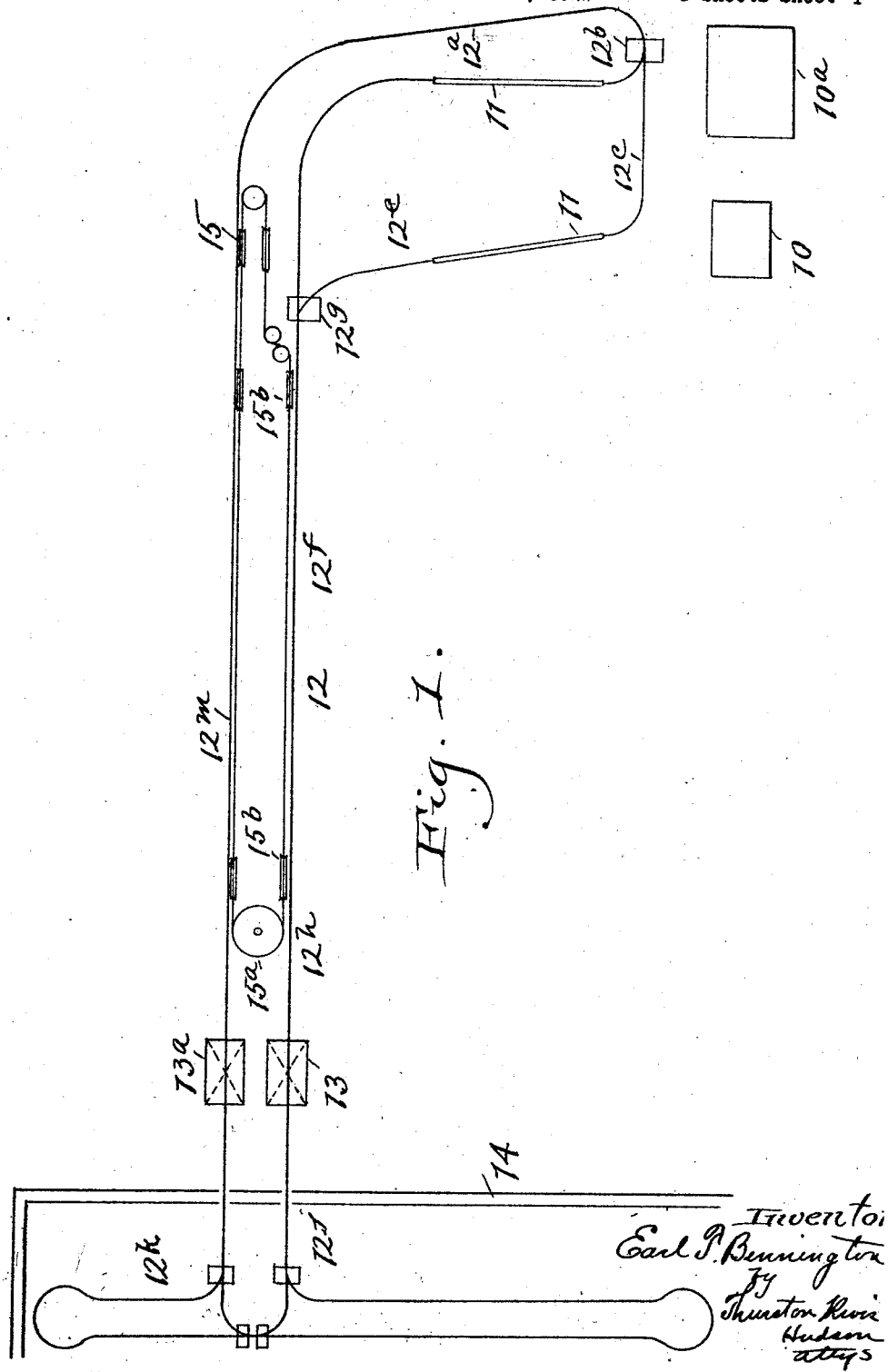

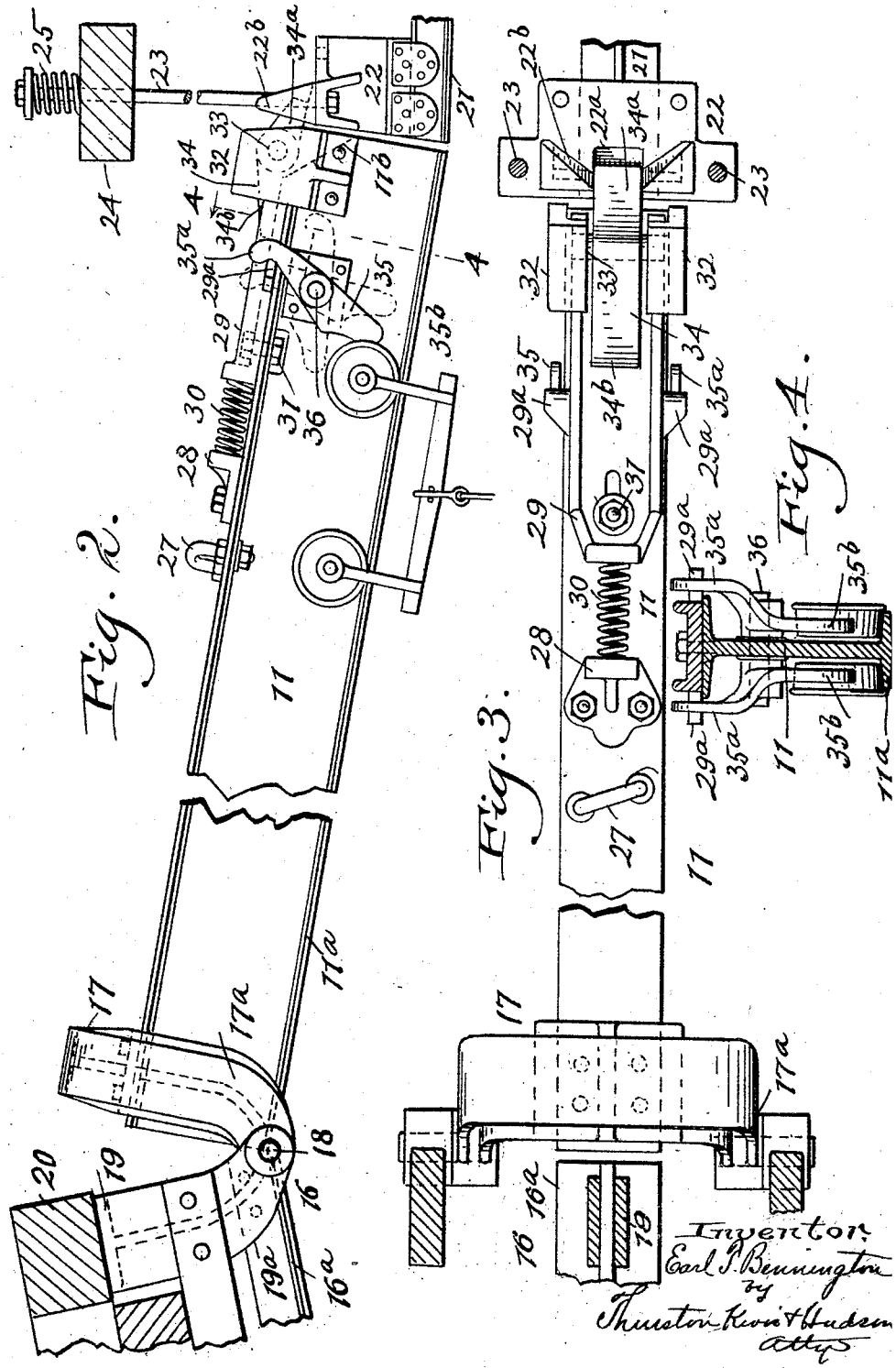

1,550,140

UNITED STATES PATENT OFFICE.

EARL T. BENNINGTON, OF CLEVELAND, OHIO, ASSIGNOR TO THE CLEVELAND CRANE & ENGINEERING COMPANY, OF WICKLIFFE, OHIO, A CORPORATION OF OHIO.

OVERHEAD SYSTEM FOR TRAVELING CARRIERS.

Application filed February 15, 1922. Serial No. 536,794.

*To all whom it may concern:*

Be it known that I, EARL T. BENNINGTON, a citizen of the United States, residing at Cleveland, in the county of Cuyahoga and State of Ohio, have invented a certain new and useful Improvement in Overhead Systems for Traveling Carriers, of which the following is a full, clear, and exact description.

This invention relates to an overhead conveying system, particularly a monorail system adapted to accommodate carriers to convey objects from one point to another.

More particularly this invention relates to an overhead conveying system for carriers wherein the carriers are wholly or in part actuated by gravity as they travel around the system, the present system contemplating an endless trackway for the carriers.

The principal object of the invention is to provide a carrier system adapted to accommodate a large number of carriers so that succeeding carriers can travel in close succession, one after the other, the whole being so designed that there is eliminated much of the hand labor in moving the carriers along the trackway from the load receiving point to the load discharging point, and back again to the load receiving point.

One of the principal features of the present invention is the provision at any point in the trackway of a tiltable or swinging section adapted when elevated to cause the carrier to run by gravity down the section and along the trackway to or toward a given point.

It is another feature of the invention that the tiltable or swinging section may be swung downward from normal position, generally for the purpose of permitting the carrier to be conveniently loaded and then elevated to a predetermined position for the discharge of the carrier, although if desired, the tiltable section could be located at a discharge point, in which event the section would be swung downward to lower the carrier and its load, to permit the load to be conveniently discharged or released from the carrier.

Preferably the tiltable section is arranged at the loading point, and when thus located it is preferably arranged to swing downward from receiving position after receiving a carrier, to permit the carrier to be loaded, and to be then swung upward above receiving position to permit the carrier to run down the section and along the trackway by gravity.

Additional features reside in the provision of automatic latching or stop mechanism whereby the tiltable section will be latched to the end of the receiving rail in perfect alignment to permit a carrier to be run from the receiving rail onto the tiltable section, with additional provision for causing the latch to be withdrawn, preferably by the act of the carrier itself so as to permit the section to be lowered without danger of the carrier running off the section. It is a further feature of this latching mechanism that after the carrier has been loaded, the tiltable section can be swung upward past the end of the receiving rail without interference by the latching mechanism, that is to say, it can be swung upward to a position to permit the gravity discharge in the manner stated above.

Another important feature of the invention resides in the particular manner of pivoting the swinging section adjacent the end of the take-off rail in a manner such that the lower flanges of a tiltable section and of the take-off or receiving section or rail are always in such a relative position that the carrier may run onto the take-off rail regardless of the position to which the tiltable section has been elevated.

The invention may be further briefly summarized as consisting in certain novel details of construction, and combinations and arrangements of parts which will be described in the specification and set forth in the appended claims.

In the accompanying sheets of drawings, Fig. 1 is a diagrammatic plan view of the major portion of a system embodying my invention, the system here shown being equipped with two of the tiltable sections for the gravity discharge of the loaded carriers; Fig. 2 is a side elevation of the tiltable section showing portions of the receiving and take-off rails, the section being here shown in position to receive an empty carrier from the receiving rail; Fig. 3 is a top plan view of the same on a slightly enlarged scale, portions being omitted or broken away; Fig. 4 is a transverse sectional view along the line 4—4 of Fig. 2; Figs. 5, 6 and 7 are diagrammatic views illustrating several positions of the tiltable section, Fig. 5 showing it in position to receive the empty carrier, Fig. 6 showing it lowered to permit the carrier to receive its load, and Fig. 7 showing it elevated to permit the gravity discharge of the loaded carrier.

The details of the carrier system may be greatly modified, and particularly as to the location of the various parts of the trackway, the length of the trackway and the area served by the trackway, and whether the carriers are gravity actuated throughout, or are gravity actuated in part and in part propelled as by means of a rope conveyor, which under certain circumstances may be desirable and under others unnecessary.

The system herein illustrated, as before stated, has two of the tiltable rail sections at the receiving point, this system being adapted particularly for receiving cotton bales from a pair of compresses which are indicated at 10 and 10$^a$ in the system here shown. The tiltable rail sections or beams 11 are arranged opposite the compresses and sufficiently close that the cotton bales can be ejected from the compresses and thrown beneath the rails so that they can be picked up and conveyed away in the manner hereinafter stated. These rail sections 11 constitute parts of an overhead monorail trackway, on the lower flanges of which, carriers are adapted to travel having any suitable grabs or load carrying devices adapted to sustain the loads, in this instance, cotton bales, as they are conveyed to the discharge point. The details of the carriers and of the trackway including the manner in which the trackway is supported from above, are immaterial to the present invention.

With the understanding that the carrier system may be other than herein shown, some of the details of the trackway will now be pointed out. The trackway as a whole may be designated by the reference character 12, and it includes a section 12$^a$, along which the empty carriers run as they are approaching the loading point, this being at the right hand end of Fig. 1. At the point 12$^b$ there is a switch, which will enable the carriers to travel along a track 12$^c$ to one tiltable rail or beam 11, or along a track 12$^d$, to the other tiltable rail or beam 11. After the carriers have been loaded and have been discharged by the movement of the tiltable rails 11 hereinafter described, they travel along sections 12$^e$ and 12$^f$ which by a switch 12$^g$ are connected onto a straight track section 12$^h$ which in this instance leads to an elevator indicated at 13, by which the loaded carriers may be delivered to tracks on one or a plurality of floors of a warehouse, which I have indicated at 14. In this instance I have shown a portion of the trackway of one floor only of the warehouse. From the elevator 13 the loaded carriers travel onto the ware-house trackway 12$^j$ and after the load is discharged at the desired point it is returned by a track section 12$^k$ to a lowerator 13$^a$, and from the latter the empty carriers are delivered onto a trackway section 12$^m$ along which they travel to the track section 12$^a$ previously referred to.

It is generally the case that no propelling means need be provided to cause the carriers to travel from the load receiving to the load discharging point, or from the load discharging point to the load receiving point, but if desired, a conveyor system may be provided along a portion of the trackway where a positive conveying or actuation of the carriers may be desirable. On the other hand, in the majority of installations, gravity alone may be relied on to cause the carriers to travel around the trackway.

In the installation shown, the end of the receiving rail connected to each tiltable rail 11 may be at a sufficient elevation above the elevator 13 that, when accelerated by running down the tiltable rails 11 the carriers will travel without being propelled in any other manner than by gravity to the elevator 13. Likewise from the elevator 13 they may be caused to travel by gravity to the discharge point and from the discharge point by gravity to the lowerator 13$^a$, and from the lowerator 13$^a$ by gravity to points adjacent the tiltable rails 11. In this connection it will be noted that in Fig. 2 the end of the receiving rail is some distance below the end of the take-off rail, this difference of height being provided solely by gravity operation of the carriers. However, if desired, the end of the receiving rail and the end of the take-off rail may be at the same elevation or height, in which event the tiltable rail will be horizontal when the empty carriers run onto it, and when the rail is elevated, the carriers will run by gravity down along the take-off rail.

If, however, the carriers are not to be gravity actuated throughout, a carrier propelling system such as indicated at 15 in Fig. 1 may be employed, as, for example, a propelling rope having suitable carrier engaging means, the rope being co-extensive with that portion of the trackway along which the positive propelling is desired. In this instance the propelling rope 15 is actuated by a power driven sheave at the point 15$^a$, and passes along guides 15$^b$ which are arranged at intervals along the trackway, and hold the rope in proper position with respect to the trackway. This rope propeller for actuating the carriers will not be described further, for it is not essential to the invention, and if it is employed in a carrier system embodying my invention its details are immaterial thereto.

Referring now to Fig. 2 which shows that important part of my invention involving the tiltable rail or beam 11, it will be observed that the rail is in the form of an I-beam, along the lower flanges 11ª of which the carriers are adapted to travel. At one end this rail is pivotally connected adjacent the end of the take-off rail which is designated in Fig. 2 by the reference character 16, this take-off rail having lower flanges 16ª along which the loaded carriers are adapted to travel. It is to be noted that the pivotal axis of the rail 11 coincides substantially with the meeting or adjacent ends of the flanges 11ª and 16ª so that the carriers may travel from the rail 11 to the take-off rail without material shock, and this is true regardless of the height to which the tiltable rail is elevated. In this instance the pivoted end of the rail 11 carries a casting 17 having arms 17ª extending down on opposite sides of the beam and pivotally connected by pins 18 located at the junction and in line with the flanges 11ª and 16ª to the downwardly extending arms 19ª of a casting 19 carried by a supporting structure 20 which supports the end of the take-off rail and also the tiltable rail or a portion of the weight of the latter. With this construction it is obvious that the free end of the tiltable rail may be swung up and down with reference to the end of the take-off rail 16, with its lower flanges along which the carriers travel always in proper relation with the lower flanges of the take-off rail.

The tiltable rail is adapted to extend between the take-off rail 16 and the end of a receiving rail which is here designated 21, and the free end of the tiltable rail is in this instance adapted to be swung from a position of alignment with the end of the receiving rail to a point below and then to a point above the end of the receiving rail as already pointed out.

Inasmuch as the free end of this tiltable rail is provided with a latch which is adapted to engage the end of the receiving rail when the tiltable rail is moved from discharging position to receiving position, it is desirable, in order that shock may be minimized, that the end of the receiving rail be yieldingly suspended so that when the swinging movement of the tiltable rail is stopped suddenly, the blow will be minimized. Therefore, the end of the receiving rail 21 is provided with a casting or bracket 22 from which extend bolts 23, which in this instance are shown as passing through an upper beam 24, with cushioning springs 25 between the beam and abutments provided on the upper ends of the bolts 23.

Any suitable means may be provided for swinging the tiltable rail, but preferably a steam hoist is used for this purpose. This steam hoist I have indicated conventionally at 26 in Figs. 5 and 6, and as here shown, it consists simply of a steam cylinder with a long stroke piston connected to a cable 26ª passing about a sheave 26ᵇ and attached to the tiltable rail 11, somewhat near its free end. In Fig. 2 I have shown an eye or stirrup 27, through which the cable 26ª, shown in Fig. 6, is adapted to be passed.

On top of this rail 11 automatic latching mechanism is provided which comprises a stationary casting 28. between which and a slidable casting 29 a spring 30 is arranged, the sliding casting 29 being adapted to move back and forth over the top flange of the I-beam which constitutes the tiltable rail 11, the rear part of the casting 29 being in this instance held to the rail 11 and guided thereon by a bolt 31 passing through an elongated slot of the casting, and the forward end of the casting 29 being guided and held down onto the top of the rail 11 by a pair of clamps 32 secured to the extreme end of the rail 11. At the forward end of the casting 29 and pivoted between a pair of ears thereof by means of a pin 33, is a latch 34, having a forwardly or outwardly projecting portion 34ª which normally projects beyond the rail 11 and is adapted to engage on top of the casting or bracket 22 secured to the end of the receiving rail, and having a rearwardly extending portion 34ᵇ adapted to rest on top of the sliding casting 29 when the latch is holding the rail 11 in alignment with the receiving rail 21 as shown in Fig. 2. However, the upper end or corner of the I-beam is cut away, as indicated by the dotted line 11ᵇ, to permit the forwardly projecting end or nose of the latch 34ª to swing downward for a purpose to be explained presently.

The bracket or casting 22 provided on the end of the receiving rail has a central part 22ª on which the forwardly projecting end 34ª of the latch 34 is adapted to engage or rest when the tiltable beam or rail is in position to receive a carrier from the receiving rail, and the bracket 22 is provided on opposite sides of this central part 22ª with a pair of upwardly and outwardly tapered guide portions 22ᵇ which when the tiltable rail is descending after the discharge of a loaded carrier, guide the end 34ª of the latch onto the central part 22ª.

The effect of this is to insure the lower flanges of the tiltable rail being in direct alignment with the corresponding flanges of the receiving section both vertically and laterally. In consequence, each time the tiltable section or rail is lowered to receive an empty carrier it is obliged to be in such position that the carrier can be run directly and without material shock from the receiving rail onto the tiltable rail.

Provided on opposite sides of the rail 11 to cooperate with the latching mechanism just described, are a pair of triggers 35, pivoted at 36. These triggers have a pair of upwardly projecting fingers 35$^a$ which project up in front of lugs 29$^a$ projecting laterally from the sliding casting 29. Additionally these triggers have downwardly projecting fingers 35$^b$.

The operation is as follows: With the pivoted rail 11 in the position shown in Fig. 2, the latch 34 holds the rail stationary, with the bottom flanges thereof in alignment with the bottom flanges of the receiving rail. With the rail 11 in this position, an empty carrier is run from the receiving rail onto the tiltable rail, past the downwardly projecting fingers 35$^b$ of the triggers 35, the triggers swinging so as to elevate the fingers 35$^b$ to permit the wheels of the carrier to pass. As soon as the wheels of the carrier pass the fingers 35$^b$ of the triggers, the latter drop back behind the wheels of the carrier, the latches being gravity actuated to cause this action. The operator then moves the carrier in the reverse direction slightly, with sufficient force so as to rock the triggers 35 and cause the upwardly extending fingers 35$^a$ thereof to engage the lugs 29$^a$ and to slide the casting 29 rearwardly or inwardly so as to move the latch 24$^a$ free of the bracket 22. The rail 11 now swings downward by gravity to a position permitted by the hoist, the hoist acting during this movement of the rail to retard the speed of the rail's downward movement. The rail is now inclined downwardly as shown in Fig. 6, being held in the position shown, by the hoist, at which time the triggers prevent the carrier running off the rail. While in this position the carrier is given its load.

As soon as the carrier receives its load the hoist is actuated to swing the free end of the rail 11 upwardly to discharge position substantially as shown in Fig. 7. It is to be noted that inasmuch as the latch 34 may swing downwardly, it does not stop the upward swinging movement of the rail when the free end of the latter passes the receiving rail 21.

The rail is swung upwardly to the position stated with a rather quick movement, and it reaches its upward position before there is any substantial travel of the loaded carrier down the rail. When the rail is thus swung upwardly, the carrier runs rapidly down the rail onto the receiving rail 16 along the trackway, either to the discharge position, or to a position such that it is picked up and caused to travel along by the rope conveyor 15.

The rail 11 is then immediately lowered to receiving position in alignment with the end of the receiving rail, the latch now operating to stop the rail 11 in the position stated. The operation above described is then repeated.

Assuming that there is a supply of empty carriers at hand, and a constant supply of the bales to be conveyed, this manner of handling the bales and of causing their discharge by gravity along the trackway is carried on at very high rapidity so that the system can be operated efficiently with very little manual labor aside from that required to operate the hoist and to load the carriers.

I have already stated that the details of the trackway system may be varied as conditions require, and that it is not necessary that the end of the receiving rail be below the end of the take-off rail, or that the tiltable rail be inclined when in carrier receiving position, for the tiltable rail may be horizontal when in receiving position in which event it will extend between the receiving and take-off rails located at the same height.

The tiltable rail or section may be variously modified as to location and function. For example, in some instances it may be desirable that the tiltable section swing from receiving position upward to discharge position and back again to receiving position only. On the other hand, in some instances it may be desirable that the tiltable section swing downward from receiving position and then back to receiving position without being elevated above its receiving position.

It may be desirable also that the tiltable section be arranged at the discharge point to permit a loaded carrier to be lowered for the purpose of discharging its load. Likewise it may be desirable that a plurality of the tiltable sections be arranged at spaced points serially along the trackway; that is to say, at given points beyond the loading point tiltable sections may be provided, each adapted to receive a carrier, and then when elevated to permit a carrier to pass by gravity to another tiltable section, or to the discharge point. In other words, one or more of these tiltable sections can be arranged at points in the trackway as so-called "boosters" to cause them at one or more points to have accelerated gravity movements.

Additionally while I have shown the tiltable section arranged between separate receiving and take-off rails, I do not regard this arrangement as necessary, for in some instances a rail may function both as a receiving and take-off rail. For example, a carrier may be run onto the tiltable rail or section at its pivoted end, and then later caused to run in the opposite direction from the tiltable rail or section onto the same rail on which it was received.

Other changes may be made in the details of construction and arrangement, and I therefore aim in my claims to cover all modifications which do not involve a departure from the spirit and scope of my invention as defined in the appended claims.

Having described my invention, I claim:

1. In a trackway system for traveling carriers, a trackway having a tiltable section pivoted at one end adjacent the end of a relatively fixed section, the fixed and tiltable sections comprising flanged rails which have tread surfaces upon which the wheels of the carriers are adapted to run, said sections being joined by a pivot, the axis of which is substantially in the plane of the tread surface of each of the sections whereby the tread surface of the tiltable and fixed sections are contiguous in all positions of the tiltable section.

2. In an overhead system for traveling carriers, a monorail trackway having lower flanges adapted to accommodate the wheels of a carrier, said trackway having a tiltable section with one end pivoted adjacent the end of a relatively fixed section, the pivotal axis coinciding substantially with the adjacent ends of the flanges of the pivoted and relatively fixed sections.

3. In an overhead system for traveling carriers, a trackway having a tiltable section arranged between receiving and take-off portions of the trackway, means for swinging the tiltable section, and a latch for holding the tiltable section in alignment with the receiving portion so that a carrier may be brought from the latter onto the former, said latch being carried by the tiltable section.

4. In an overhead trackway system for carriers, a trackway having a pivoted section arranged between receiving and take-off portions, means whereby the free end of said tiltable section may be swung below and above the receiving portion, a latch for holding the tiltable section in alignment with the receiving portion, said latch arranged to permit the free end of the tiltable section to be swung past the receiving portion.

5. In an overhead system for carriers, a trackway having a pivoted section arranged between receiving and take-off portions, a latch for stopping the movement of the pivoted section when it is being swung downward from elevated position, and means co-operating with said latch to cause the end of the pivoted section to be aligned with the end of the receiving portion when the pivoted section comes to a stop.

6. In an overhead trackway system for carriers, a trackway having a tiltable section arranged between receiving and take-off portions of the trackway, means for swinging said tiltable section so that the one end thereof may be lowered and then elevated, and means carried by the tiltable section for preventing the carrier running off the tiltable section when said end is lowered.

7. In an overhead trackway system for traveling carriers, a trackway having a tiltable section arranged in the system between receiving and take-off portions of the trackway, said section having one end pivoted at the end of the take-off portion, means for raising and lowering the free end of said section, a latch for holding the section in alignment with the receiving portion so that said section may receive a carrier, and a device carried by the tiltable section for holding the carrier thereon when said tiltable section is swung downward.

8. In an overhead trackway system for traveling carriers, a trackway having a tiltable section arranged between receiving and take-off portions of the trackway, said tiltable section having one end pivoted at the end of a take-off portion, a latch carried by the free end of said tiltable section for holding the latter in alignment with the receiving portion so that the carrier may be run onto the tiltable section, and a trigger carried by the tiltable section and mounted so that the carrier may move past the same and then serving to prevent the carrier running back off the tiltable section when the latter is swung downward.

9. In an overhead trackway system for traveling carriers, a trackway having a tiltable section arranged between receiving and take-off portions of the trackway, said tiltable section having one end pivoted at the end of a take-off portion, a latch carried by the free end of said tiltable section for holding the latter in alignment with the receiving portion so that the carrier may be run onto the tiltable section, a trigger carried by the tiltable section and mounted so that the carrier may move past the same and then serving to prevent the carrier running back off the tiltable section when the latter is swung downward, and means whereby said trigger may remove the latch from holding engagement with the end of the receiving portion.

In testimony whereof, I hereunto affix my signature.

EARL T. BENNINGTON.